No. 779,919. Patented January 10, 1905.

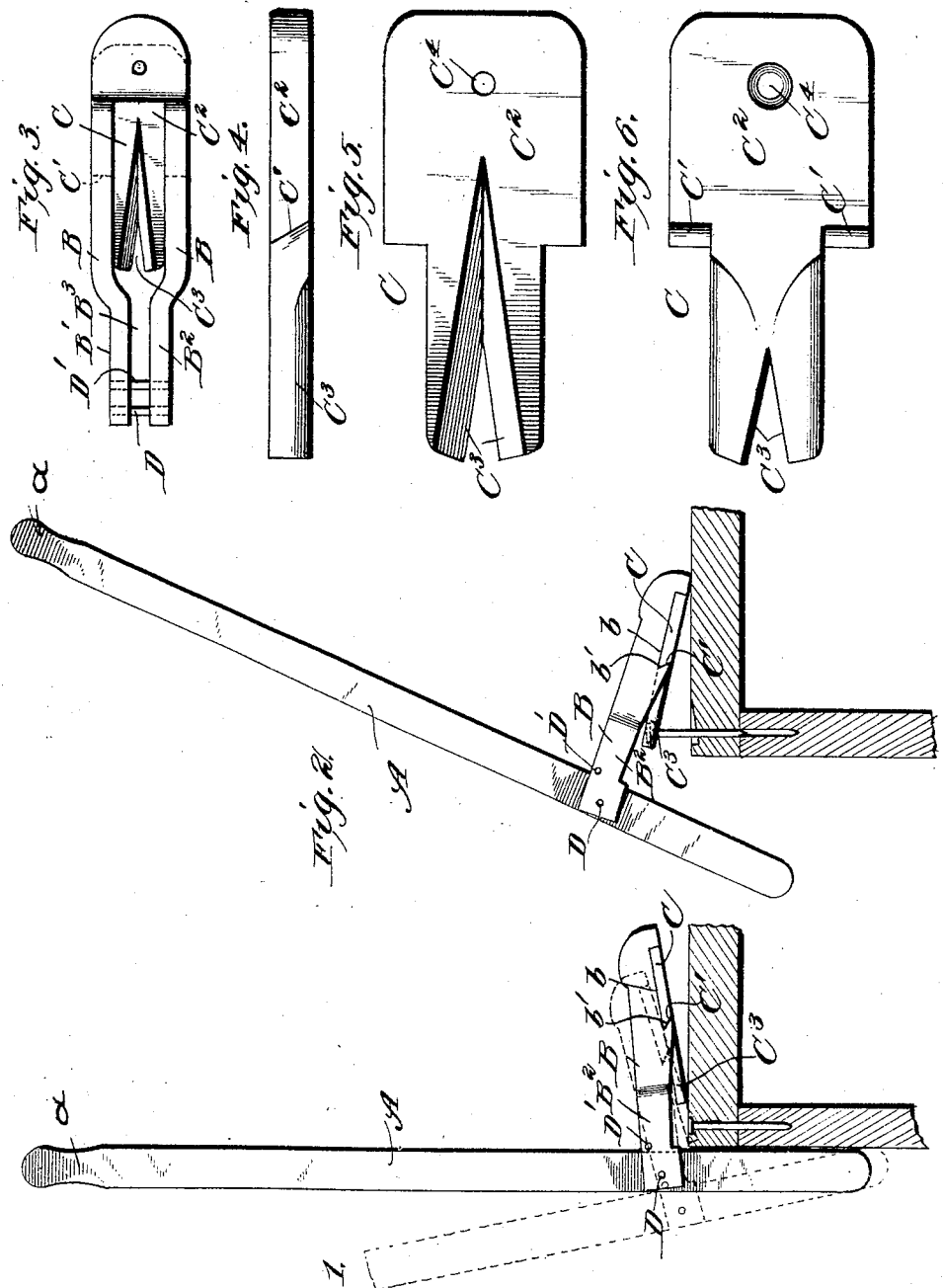

UNITED STATES PATENT OFFICE.

HARRY LAFAYETTE FISH, OF EAU CLAIRE, WISCONSIN.

NAIL-PULLER.

SPECIFICATION forming part of Letters Patent No. 779,919, dated January 10, 1905.

Application filed March 19, 1904. Serial No. 198,989.

*To all whom it may concern:*

Be it known that I, HARRY LAFAYETTE FISH, a citizen of the United States, and a resident of Eau Claire, in the county of Eau Claire and State of Wisconsin, have made certain new and useful Improvements in Nail-Pullers, of which the following is a specification.

My invention is an improvement in nail-pullers, intended especially for use in pulling nails from boxes and the like; and the invention consists in certain novel constructions and combinations of parts, as will be hereinafter described and claimed.

In the drawings, Figure 1 is a side elevation of my invention as in use, with the parts in the position they occupy preliminary to gripping the head of the nail. Fig. 2 is a vertical elevation of the puller, showing the claw and its carrier in the position they occupy during the operation of pulling the nail. Fig. 3 is a detail top plan view of the carrier with the claw in place. Fig. 4 is a side elevation, Fig. 5 a top plan view, and Fig. 6 a bottom plan view, of the claw-section.

As shown, the puller includes the main bar A, the carrier B, and the claw-plate C. The claw-plate C is carried by the carrier or bar B, which latter is pivoted at D to the main bar A, so it may rock to the position shown in Fig. 1, and such carrier is provided at D' with a stop by which the carrier and main bar are rigid in one direction of movement, as in tilting the carrier from the position shown in Fig. 1 to that shown in Fig. 2. In the construction shown the carrier B is bifurcated at one end, B', forming the arms $B^2$, between which the bar A is pivoted on the pin D, the stop D' being a separate pin crossing the slot $B^3$ between the arms $B^2$ and arranged to abut the main bar A, as will be understood from Figs. 1 and 3 of the drawings. By this construction the carrier B is pivoted at one end to the main bar, and such carrier is provided in its under side near its other end with a recess $b$, one wall, $b'$, of which is undercut to receive the inclined shoulder C' at one end of the head $C^2$ of the claw. The claw C has at one end the nail-pulling claw proper, $C^3$, and at its other end the head $C^2$, which fits in the recess $b$ in the carrier B and is held by a screw passing through an opening $C^4$ in the claw and into the carrier, as shown in dotted lines, Fig. 3, or by other suitable fastening devices, as may be desired.

It will be noticed that the claw proper, $C^3$, projects forwardly at the under side of the outer end of the carrier B and may be engaged with the nail-head when the puller is adjusted from the full-line position shown in Fig. 1 to the dotted-line position indicated in said figure, after which the puller may be rocked to the reverse position by pulling on the bar or handle end $a$ of said bar or lever A, when the nail will be withdrawn, as will be understood from Fig. 2 of the drawings.

In operation when the parts are in full-line position (shown in Fig. 1) the operator clasping the handle at the top of the main bar A may push said bar to bring the parts to the position indicated in dotted lines in said figure, when the claw proper will engage with the head of the nail. The operator may now pull back on the upper end of the main bar, bringing same into contact with the stop D' to tip the claw and its carrier to the position shown in Fig. 2, drawing the nail, as will be understood from said figure. It will be noticed that the main bar projects considerably below its pivotal connection with the carrier, so that the lower end of the main bar may be crowded against the box in forcing the claw into engagement with the head of the nail.

Having thus described my invention, what I claim as new, and desire to secure by Letters Patent, is—

1. The nail-puller herein described comprising the carrier provided at its under side at one end with a recess having an undercut wall, the claw-plate having at one end a head fitting in the recess in the carrier and having at its other end a forwardly-projecting claw proper adapted to engage with the head of a nail, the end of the carrier opposite the recess for the claw-plate being bifurcated and provided with a pivot-pin and with a stop-pin crossing the space between the arms of the carrier and the main bar pivoted at a point above its lower end on the pivot-pin of the carrier and arranged to abut the stop-pin of such carrier substantially as and for the purposes set forth.

2. A nail-puller comprising a main bar, a carrier pivoted to the main bar, means limiting the relative movement of the main bar and carrier in a direction toward each other, and a claw-plate adapted to engage a nail-head and projecting forwardly and downwardly from the carrier, substantially as set forth.

3. The combination in a nail-puller of a carrier, a main bar to which said carrier is pivoted at one end at a point above the lower end of the main bar, a stop for limiting the pivotal movement of the carrier and main bar and a claw-plate secured at one end to the other end of the carrier and projecting at its other end forwardly toward the main bar substantially as set forth.

4. A nail-puller comprising a main bar, a carrier pivoted at one end to the main bar at a point above the lower end of the latter, means limiting the relative movement of the main bar and carrier in a direction toward each other, and a claw-plate supported by the carrier and having at the under side of the carrier a portion projecting forwardly and downwardly to engage with a nail-head substantially as described.

5. A nail-puller comprising a main bar, a carrier connected therewith and having a limited pivotal movement and provided on its under side with a recess, and the claw-plate having a head fitting in said recess and a claw portion projecting forwardly toward the main bar substantially as set forth.

6. A nail-puller comprising a carrier slotted in one end and provided with a pivot-pin and with a stop-pin crossing said slot, the main bar pivoted in said slot and arranged to abut the stop-pin and a forwardly-projecting claw on the under side of the carrier to engage with a nail-head substantially as set forth.

7. A nail-puller comprising a main bar, a carrier connected at one end to the main bar above the lower end of the latter, and a claw on the under side of the carrier between its connection with the main bar and its outer end, the said claw facing toward the main bar and being arranged to engage a nail-head when forced in the direction of the main bar, and means limiting the relative movement of the main bar and carrier in a direction toward each other, the lower end of the main bar forming the fulcrum in setting the claw into engagement with a nail, and the free end of the carrier forming the fulcrum in pulling the nail, the upper end of the main bar forming the handle in both operations, substantially as set forth.

HARRY LAFAYETTE FISH.

Witnesses:
W. P. BARTLETT,
S. P. BARTLETT.